(12) United States Patent
Wells (10) Patent No.: US 7,032,856 B2
(45) Date of Patent: Apr. 25, 2006

(54) MODERN THERMAL SENSOR UPGRADE FOR EXISTING MISSILE SYSTEM

(75) Inventor: Michael L. Wells, Canyon County, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/413,786

(22) Filed: Apr. 15, 2003

(65) Prior Publication Data
US 2004/0206851 A1 Oct. 21, 2004

(51) Int. Cl.
F41G 7/20 (2006.01)
F41G 7/32 (2006.01)
G06T 3/40 (2006.01)

(52) U.S. Cl. ............. 244/3.12; 244/3.1; 244/3.11; 244/3.15; 244/3.16

(58) Field of Classification Search .......... 244/3.1–3.3; 375/175, 176, 179, 185, 195; 348/441–459
See application file for complete search history.

(56) References Cited

U.S. PATENT DOCUMENTS

| | | | |
|---|---|---|---|
| 3,729,151 A * | 4/1973 | Hecker ................... | 244/3.14 |
| 4,010,365 A * | 3/1977 | Meyers et al. ............ | 244/3.16 |
| 4,123,134 A * | 10/1978 | Meyers ................... | 244/3.16 |
| 4,581,636 A * | 4/1986 | Blaker et al. ............ | 348/442 |
| 5,062,586 A * | 11/1991 | Hobson et al. ........... | 244/3.12 |
| 5,651,512 A * | 7/1997 | Sand et al. .............. | 244/3.11 |
| 5,703,965 A | 12/1997 | Fu et al. | |
| 5,794,509 A | 8/1998 | DeLair et al. | |
| 5,796,474 A | 8/1998 | Squire et al. | |
| 5,848,199 A | 12/1998 | Naqvi | |
| 5,867,613 A | 2/1999 | Nishikubo et al. | |

(Continued)

OTHER PUBLICATIONS

PCT/US2004/010475; PCT International Search Report mailed Aug. 18, 2004.

*Primary Examiner*—Bernarr E. Gregory
(74) *Attorney, Agent, or Firm*—Renner, Otto, Boisselle & Sklar, LLP (57) ABSTRACT

A method of mapping a first array to a second array is useful where (1) each of the arrays has pixels in sequential columns and rows and the first array has sequential integers identifying each row of pixels, (2) sequential integers identify each column of pixels, and a numerical value is associated with each pixel, (3) the first and second arrays have (or can be made to have) a one to one pairing between columns of the first and second arrays, and (4) groups of four unique pixels in the same column of the first array are paired one to one with a pixel in the paired column of the second array. The method includes the steps of, for each column in the first array, selecting the values associated with the pixels in four sequential odd numbered rows to form an odd group of four unique pixels, combining the values associated with the pixels in the first three odd numbered rows of the odd group to form an odd combined value, and mapping the odd combined value to the pixel in the column and row of the second array with which the odd group is paired, and thereafter selecting the values associated with the pixels in four even numbered rows to form an even group of four unique pixels, combining the values associated with pixels in the last three rows of the even group to form an even combined value, and mapping the even combined value to the pixel in column and row of the second array with which the even group is paired.

22 Claims, 5 Drawing Sheets

U.S. PATENT DOCUMENTS

| | | |
|---|---|---|
| 5,999,663 A | 12/1999 | Edwards et al. |
| 6,041,688 A | 3/2000 | Woznica et al. |
| 6,072,889 A | 6/2000 | Deaett et al. |
| 6,084,640 A | 7/2000 | Nishikubo et al. |
| 6,293,488 B1 | 9/2001 | Wells et al. ............... 244/3.11 |
| 6,469,783 B1 | 10/2002 | Wells et al. |

* cited by examiner

MODERN THERMAL SENSOR UPGRADE FOR EXISTING MISSILE SYSTEM

FIELD OF THE INVENTION

The present invention relates to upgrading missile control systems designed to use an infrared sensor having a 480×120 pixel sensor array to use a more modern sensor with a 640×480 pixel sensor array. The present invention finds particular application in tracking and controlling TOW missiles.

BACKGROUND OF THE INVENTION

Control systems of certain guided missiles track the missile using infrared cameras having a sensor array that measures 480×120 pixels. The video information from this camera is fed to image processing hardware and software that uses various processing algorithms to extract information from the video input. Particularly, the video information is processed to determine the location of the missile by searching for the missile's thermal signature. Systems of this general type are used to track and guide TOW missiles. Because these systems are part of a servo control loop that controls the direction of the missile in flight, a very fast response from every component in the system is necessary.

Since the development of infrared cameras with 480×120 pixel arrays, newer cameras with more and smaller pixels have been developed. The advent of these newer, improved cameras has provided an opportunity to improve the accuracy of the information derived from the camera. Specifically, the newer cameras not only have larger arrays, but they are more sensitive and can detect images at a greater distance than the older infrared cameras. However, the substantial investment in hardware and software that processes the video information in the balance of the control system makes it advisable to retain those components unaltered. Therefore a method was sought to map the pixels of the newer camera (in this application called the "sensor array") to the array of larger pixels of the processor (in this application called the "tracker array").

A conventional method for converting a larger array of a camera or other sensor to a smaller one of a processor would be to accumulate an entire frame, for example, collect an odd scan then an even scan of an array, and then process the data in the frame, assigning each sensor pixel to the closest pixel of the coarser grid of the tracker array. The value assigned to some target pixels might be the weighted average of the closest sensor array pixels. Such a method works, but it requires time to accumulate a full frame of data before any further processing can take place. In the context of a missile controller where the data is used to direct a missile in flight such a lag is unacceptable. Accordingly, there is a need for a faster method to convert data from a fine array of a sensor to a courser tracker array. The present invention addresses that need.

SUMMARY OF THE INVENTION

The present invention teaches that the output from a fine grained sensor array can be mapped to a coarser format for processing specifically the present invention is described in the content of a 640×480 sensor array that is converted to a 480×120 processing format. This is achieved by using the odd and even sensor scans separately and on the fly, mapping selected pixels from the odd sensor scan to selected tracker array pixels and mapping selected pixels from the even sensor scan to selected tracker array pixels. Specifically in each column of the sensor array the pixels in the first three rows of the odd sensor scan are mapped to the pixels in the first odd row of tracker array pixels; the pixels in the fourth odd sensor scan row are disregarded. The pixels in the fifth through seventh odd sensor scan rows are mapped to the second odd tracker array row of pixels, and so forth with the odd numbered rows of sensor pixels. After the odd numbered rows of sensor pixels are scanned and mapped as described, the even numbered rows of sensor pixels are scanned and mapped. In transforming the data from the even scan, the first even numbered row of sensor pixels is disregarded, and the second, third, and fourth even numbered rows of sensor pixels are mapped to the first even numbered row of the tracker array; the fifth even numbered row of sensor pixels is disregarded and the pixels in the sixth, seventh, and eighth even numbered rows of sensor pixels are mapped to the second even numbered row of tracker array pixels, and so forth with the even numbered rows of pixels. This method allows processing on the fly and there is no need to wait until all rows (odd and even) in the frame have been scanned before processing the image. Instead, the entire image is processed at the rate at which all of the odd or even rows are scanned. This results in minimal errors because, although 25 percent of the pixels are discarded, no two sequential pixels are discarded. With every four rows of sensor array pixels, a single row of tracker array pixels is fully mapped and can be passed to the controller as input to the missile control system. As a result, latency is minimized while the system still is able to take advantage of the finer, more sensitive modern sensor array such as are used in Generation 3 infrared sensors.

DETAILED DESCRIPTION

Figure 1:
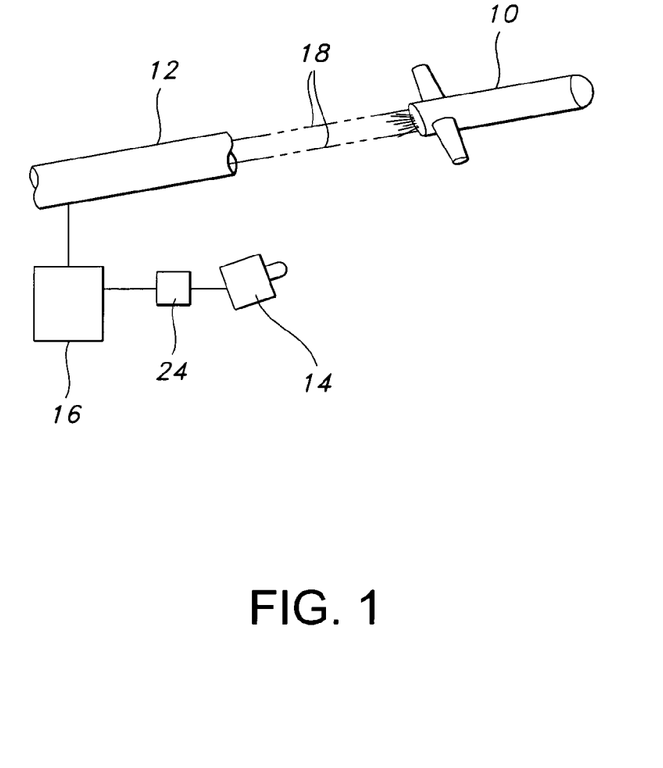
FIG. 1 is a schematic illustration of a wire guided missile in flight with an infrared sensor detecting its position and directing its output to a controller.

FIG. 1 shows a guided missile 10 in flight, its launcher 12, an infrared sensor (or camera) 14 to detect the missile's actual position, and a controller 16 that sends signals to the missile to control its direction of travel. A pair of wires 18 connects the missile launcher 12 and the missile 10 to send signals from the controller 16 to the missile. This system is a servo control system. Because the missile 10 is traveling quite fast and is dynamic about its flight line, it is important that there be as little delay as possible in processing the information from the camera 14 so that the controller 16 can send appropriate control signals to the missile to maintain its position on the flight line to the target.

A system such as that illustrated schematically in FIG. 1 represents the TOW missile system, among others. While the teachings of this application are applicable to the TOW system, they are also applicable to other missile systems and to any situation where it is necessary to transform data from a fine array to a courser array without undue latency. Moreover, while the missile 10 is shown controlled by signals sent by wires 18, the teachings are applicable no matter how the signals are sent to control the missile, and the teachings of this invention may also be used where the transformation from one array to another has nothing to do with missile guidance. With the understanding that the invention has broad and general applicability, the following is a description of one specific application from which those skilled in the art will be able to understand the scope of application to which the teachings of this invention are applicable.

Figure 2:
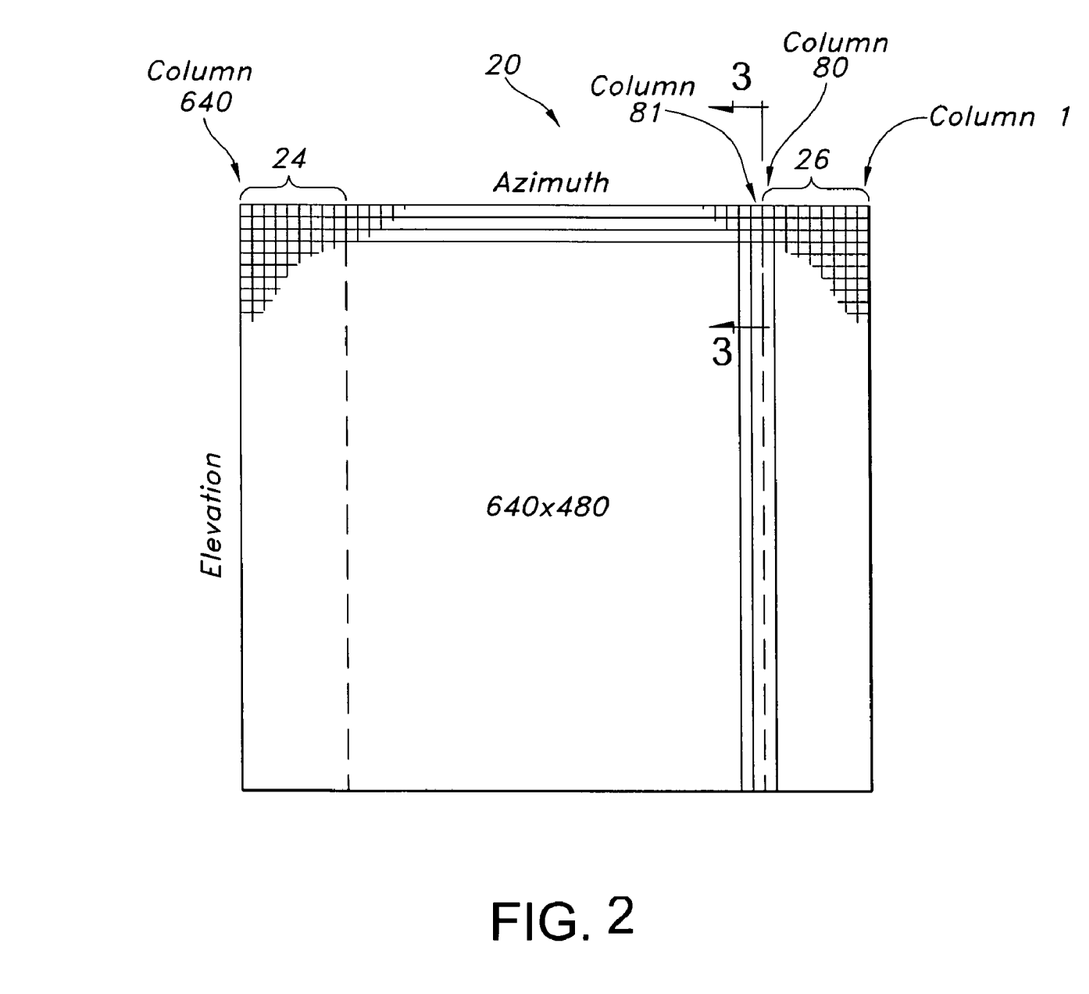
FIG. 2 is a schematic illustration of a sensor array that has 640 columns arranged in 480 rows and showing 80 columns on each margin that are ignored.
Figure 3:
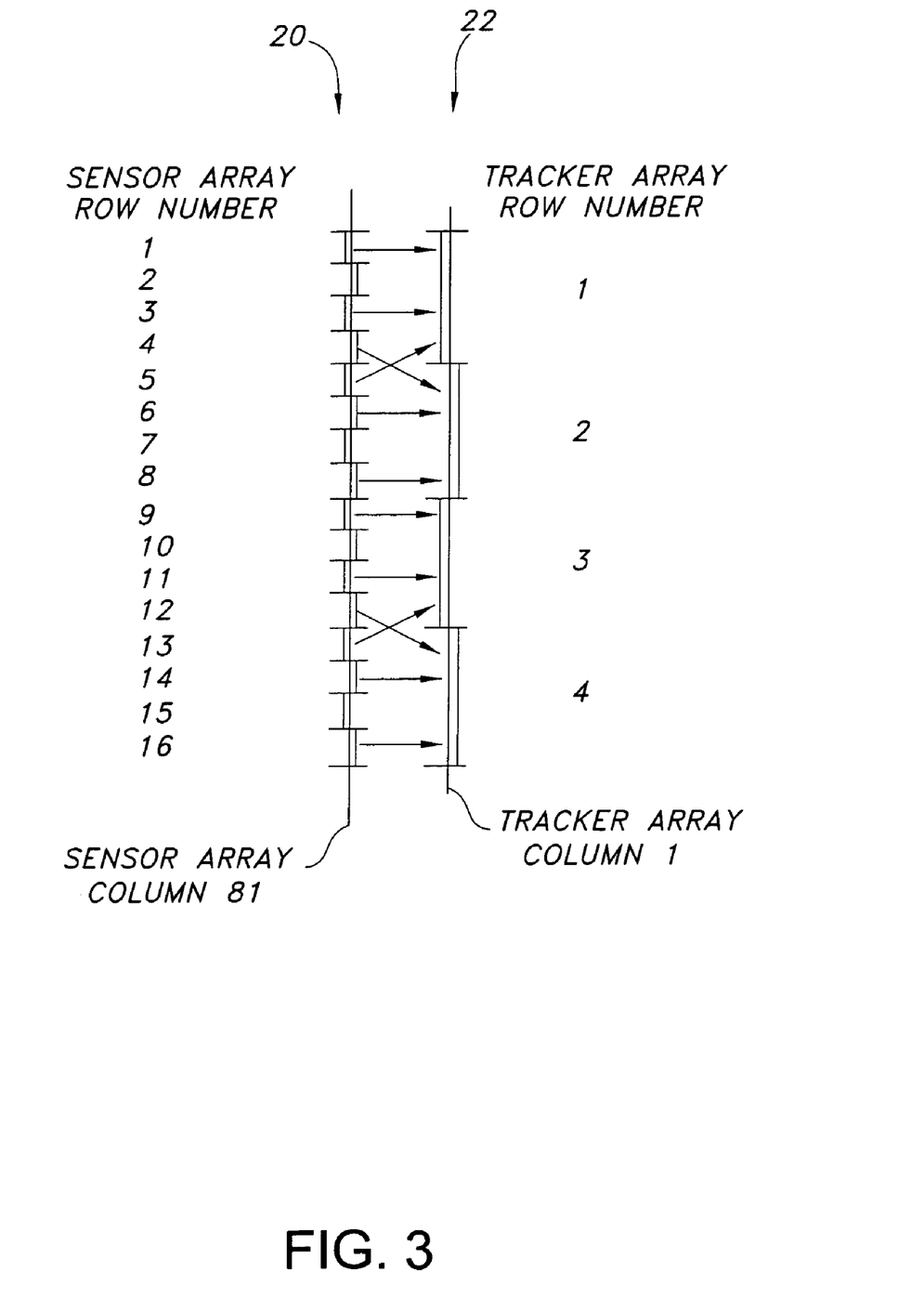
FIG. 3 is a schematic side view of a portion of the sensor array of FIG. 2 showing a corresponding tracker array and how the pixels from the 480 rows of the sensor array are mapped to the 120 pixels of the tracker array.

The controller 16 (FIG. 1) includes hardware and software designed for a 480×120 rectangular input array 22 shown schematically in FIG. 3 in an edge-on view. This input array 22 accommodates older sensors that have a 480×120 rectangular array of pixels. Newer sensors such as that used in infrared camera 14 have a 640×480 rectangular array 20 of pixels. In this application the array of pixels generated by the output of the infrared camera 14 is termed the "sensor array" 20 and the input array for the controller is termed the "tracker array" 22. FIG. 2 schematically shows the sensor array 20, and FIG. 3 shows a schematic, vertical cross section through one column of the sensor array 20 and the tracker array 22. The term "pixel" is used both to mean a particular location in an array and to mean the value stored at that location; which meaning is intended is readily apparent from the context. The horizontal and vertical axes of the array 20 are considered as representing the azimuth and elevation, respectively, although any other orientation could be used.

The present invention teaches how to make a processor 24 that connects the sensor array 20 to the tracker array 22, mapping the pixels of the former to the appropriate pixels of the latter. The processor 24 is designed to operate with a sensor array 20 that scans the scene continuously first from left to right and then from right to left. The left to right scans cover the odd numbered rows of the array 20 while the scans in the opposite direction cover the even numbered rows. This is conventional, and the tracker array 22 is adapted to receive signals in the same manner. The present invention teaches how to map the data in the 640×480 sensor array 20 resulting from scanning the sensor to the 480×120 array 22 of the controller 16 of the missile control system.

The azimuth transformation involves converting 640 columns in the sensor array 20 into 480 columns in the tracker array 22. This can be accomplished by simply ignoring 80 columns on each margin 26, 28 of the sensor array (FIG. 2) and using only the centrally located 480 columns of data from the sensor array's 640 columns. In this way, the columns correspond one-to-one from the sensor array 20 to the tracker array 22. The number of columns at each edge of the sensor array that are discarded depends on the field of view of the camera 14. A camera with a narrower field of view would require fewer or no columns to be discarded, and vice-versa. As discussed in connection with FIG. 4, the azimuth signals may be analog signals, in which case a simple filter may be used to reduce the video bandwidth and so narrow the field of view to 480 columns of pixels.

The conversion of the 480 vertical rows of sensor array pixels to 120 rows of tracker array pixels proceeds in a different manner. This process is illustrated in FIG. 3 where alternating rows of pixels are shown by heavy lines on opposite sides of a vertical line representing the sensor array 20. Similarly, the odd and even rows of pixels in the tracker array 22 are represented by staggered heavy lines. In carrying out the process, selected pixels from the odd sensor rows (e.g., sensor rows 1, 3, 5, 7 . . . ) are combined and mapped to a selected odd row (e.g., target row 1 or 3 or 5 etc.) in the tracker array 22. The process is repeated until all the odd rows of the sensor array 20 have been processed. Next, selected pixels in the even sensor rows (e.g., sensor rows 2, 4, 6, 8, 10 . . . ) are combined and mapped to a selected even row (e.g., target row 2 or 4 or 6 etc.) of the tracker array 22. This continues until all the even rows have been processed, after which the cycle continues with the odd rows. A complete scan of all of the odd numbered rows or even numbered rows completes what is termed a "field". When both odd and even rows have been scanned the result is a complete "frame". Note that all information needed to update the values at all of the odd or even pixels of the target array 22 is present with only one field of delay required, instead of the more conventional one frame delay.

The arrows in FIG. 3 connecting pixels in the sensor array 20 in the tracker array 22, the pixels in the first three odd rows (sensor rows 1, 3, and 5) are summed and mapped to row 1 of the tracker array. The pixels in the fourth odd sensor row (sensor row 7) are discarded. More specifically, processor 24 collects the values stored in each pixel in each column as the scanning proceeds. When the processor has accumulated the values for the pixels in the first three odd numbered rows in the first column of the sensor array 20 to be processed (in the specific application described, column 81), those values in each column are summed and mapped to the pixel in the first odd numbered row of the corresponding column (tracker array column 1) of the tracker array 22. This process continues for each of the central 480 columns of the sensor array 20, mapping the three sensor pixels in the first three odd numbered rows of the sensor array to the pixel in row 1 of the tracker array 22 of the corresponding column. The values of the pixels in the fourth odd numbered row of the sensor array (sensor row 7) are ignored. The process repeats itself as the second set of four sensor array rows (sensor rows 9, 11, 13, and 15) are scanned until all the odd rows have been processed in the same way.

As shown in FIG. 3, sensor pixels in rows 1 and 3 align with the tracker array row 1, and sensor row 5 is immediately adjacent the boundary between tracker array rows 1 and 2. Combining the value at the pixel in sensor row 5 with those in sensor rows 1 and 3 introduces a small but acceptable alignment error in the value of the pixels in target row 1. The fourth odd sensor row (row 7) is so far from any odd tracker array row that mapping it to one of the odd tracker array pixels would introduce an unacceptable amount of alignment error, and for that reason it is discarded.

Next the even sensor rows (sensor rows 2, 4, 6 . . . ) are processed. In processing the even rows, the first even row (sensor row 2) is discarded, and the successive three even rows (sensor rows 4, 6, and 8) are summed and mapped to the first even row of target pixels (target row 2). The fifth even row of sensor pixels (sensor row 10) is discarded, and the succeeding three even sensor rows (rows 12, 14, and 16) are summed and mapped to the next even target row (target row 4). This process continues until all the quartets of even sensor rows have been processed, discarding the first and summing the next three for mapping to the adjacent target row, until all the odd sensor rows have been processed. Thereafter the cycle returns to processing the ever sensor rows.

It should be apparent that this process does not wait for an entire frame, that is, a full set of pixels from an odd or even scan, to be accumulated before mapping data to the tracker array. Instead, as soon as three successive odd or even pixels in a column have been scanned, they are summed and mapped to the tracker array, and so the entire target array pixel is updated with the complete scanning of each field of sensor input data.

Although the method taught by the present invention discards 25 percent of the pixels within its field of view (and 43% over all if the conversion is from 640 columns to 480 columns), it operates on the fly. It therefore can use the advantages inherent to modern infrared cameras without having to change the hardware and software in controller 16 used to process the image data and operate the servo control loop that controls the flight of the missile 10. Chief among the advantages of the modern infrared camera 14 with a 640×480 sensor array is longer range. Heretofore, a limit on the range of TOW missiles has been the distance at which the infrared camera could distinguish targets and track the missile. While data conversion schemes are possible that would use all of the pixels of the 620×480 sensor array, such schemes require accumulating an entire frame of data before processing can begin. The latency in such a scheme makes it unacceptable for use in a servo control loop for a missile traveling at 1000 ft. per second.

The process taught by the present invention may be carried out by software or code executed by general purpose hardware in the processor 24. As an alternative the process taught by the present invention may also be embodied in dedicated hardware or a combination of software/general purpose hardware and dedicated hardware. If embodied in dedicated hardware, the process can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

Also, where the process taught by the present invention is carried out by software or code, it can be embodied in any computer-readable medium for use by or in connection with an instruction execution system such as, for example, a processor in a computer system or other system. In this sense, the process may comprise, for example, statements including instructions and declarations that can be fetched from the computer-readable medium and executed by the instruction execution system. In the context of the present invention, a "computer-readable medium" can be any medium that can contain, store, or maintain the process for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Figure 4:
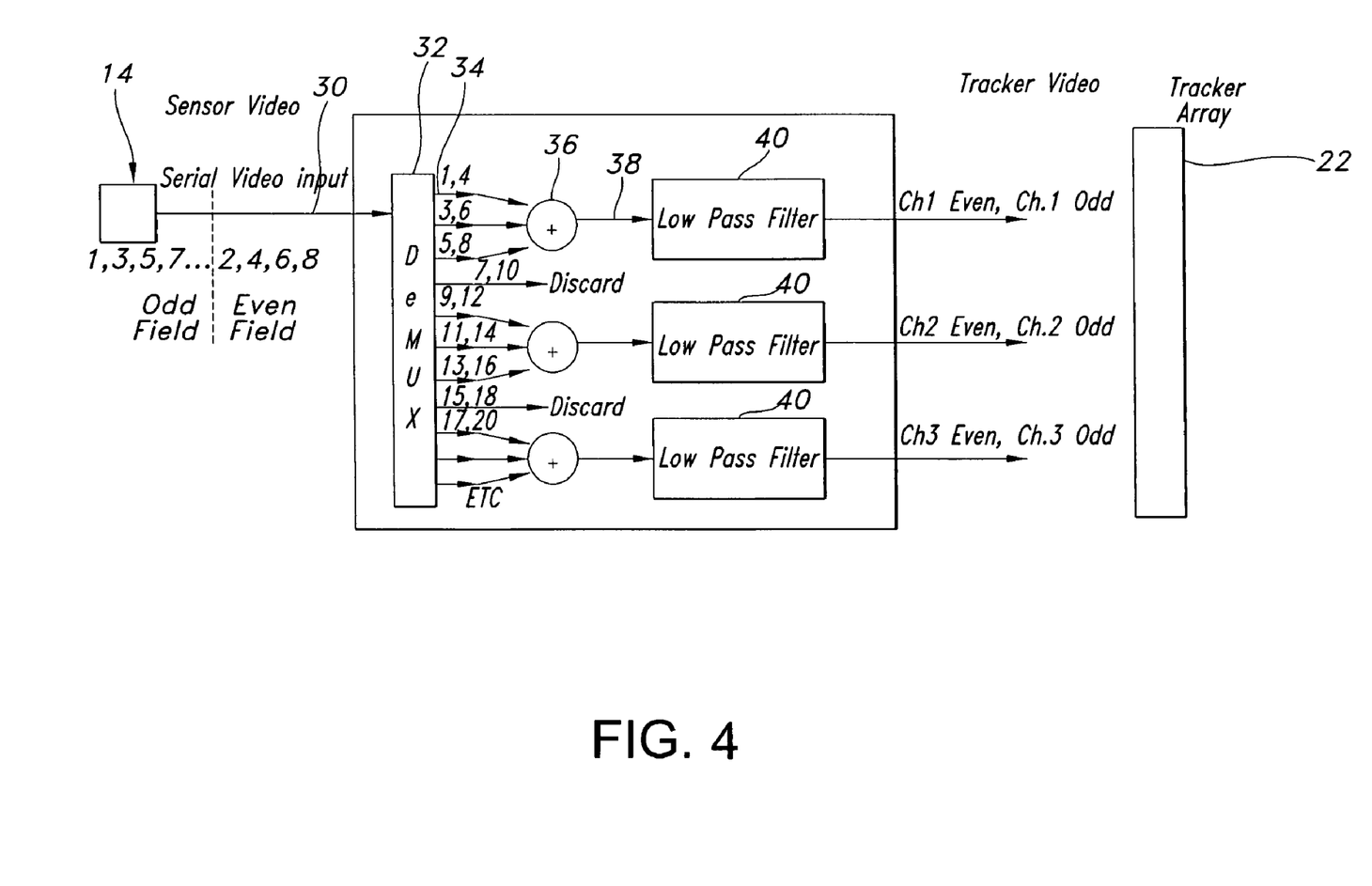
FIG. 4 is a schematic diagram showing hardware for practicing the teachings of the present invention.

FIG. 4 shows a schematic illustration of a hardware implementation of the teachings of the present invention. In FIG. 4 the infrared sensor 14 is a Generation 3 infrared sensor. The output data from the sensor 14 is in conventional serial format and is shown as serial input 30. This data arrives first with values for one field at a time, that is, first the data for all of the odd rows arrives, then the data for all the even rows. This data is directed to a de-multiplexer 32 which converts the serial video input 30 into a parallel format, separating each incoming value and directing it to a corresponding input channel shown schematically at arrows 34. The values from the de-multiplexer 32 are passed to adders 36. There is one adder 36 for each pair of pixels in the tracker array 22. Because the data is processed one field at a time, the adders 36 are available to process the data from the even rows (the even field) as soon as the odd field is processed.

The output from each adder 36, represented by arrows 38 is fed through a low pass filter 40. The low pass filters 40 reduce the band width of the high resolution video signal that is passed to the tracker array 22 to one that the tracker is capable of handling by eliminating noise in the azimuth direction.

Figure 5:
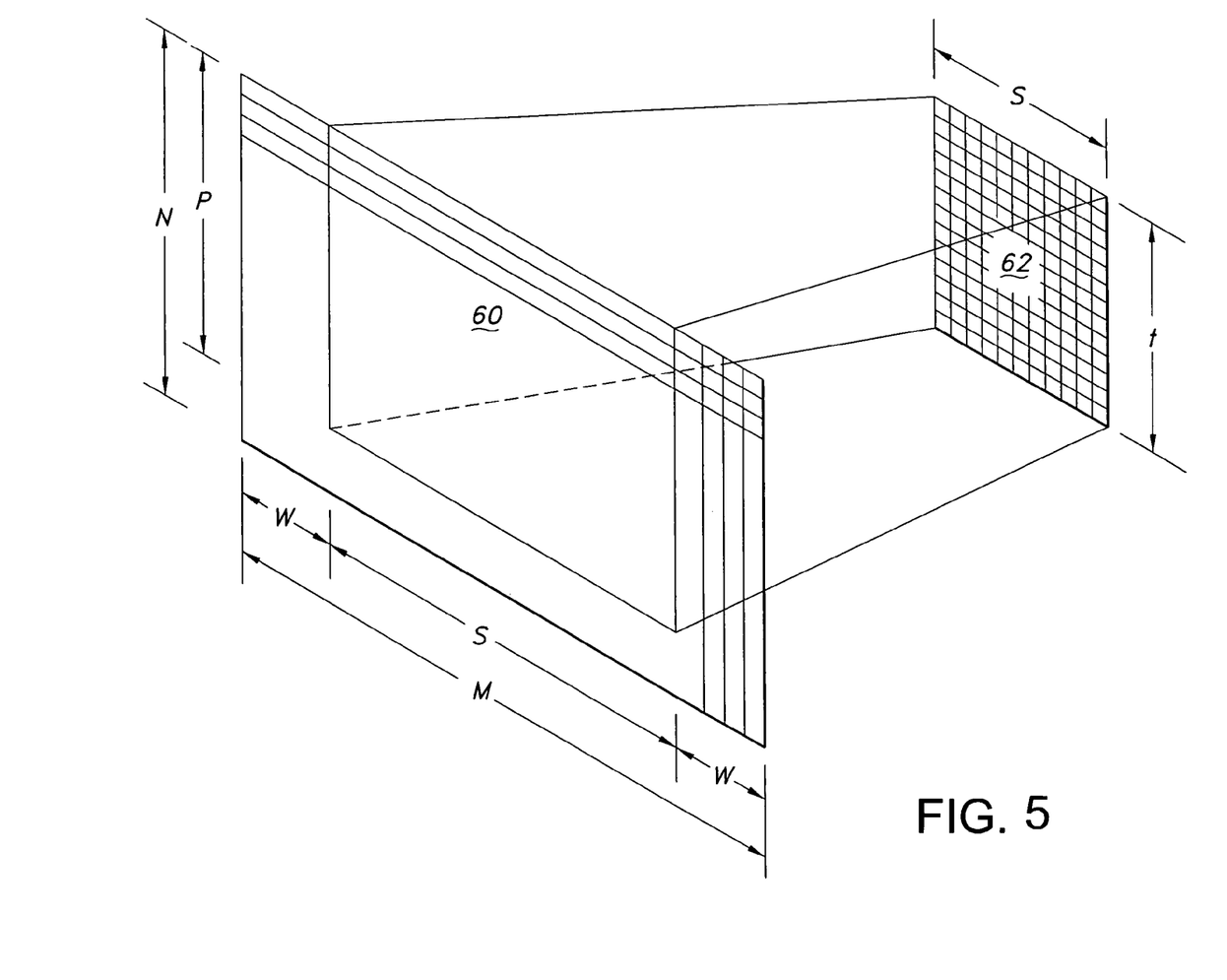
FIG. 5 is a schematic diagram showing the process of mapping a larger array to a smaller array.

It should be apparent that the teachings of the present invention may be generalized to the process of mapping a larger array to a smaller array when processing time is critical. FIG. 5 illustrates the generic process. Given two arrays, one 60 larger and the other 62 smaller, each having pixel values stored at locations defined by rows and columns, the present invention teaches how to map the larger to the smaller if the resulting field of view is acceptable. In the example, the array 60 is m by n pixels; the array 62 is s by t pixels. The first step is to match the widths of the arrays. This can be done by simply disregarding the values in the larger array 60 that exceed the number of columns of the smaller array 62. In the example, the width, w, of each column is given by the formula $w=\frac{1}{2}(n-s)$. To accomplish this the two bands of width w on opposite sides of a vertical centerline of the larger array 60 are disregarded. However other discarding patterns are possible. Some or all of the disregarded columns may be on one side of the centerline of the larger array if, for example, the array 60 is a thermal sensor for tracking a missile that is launched from one side of the line of sight, as is the case in the Bradley Fighting Vehicle.

The next step is to determine the size of the groups in each column that will be mapped from the larger array to the smaller. This is done by dividing the number of rows in the larger array (n) by the number of rows in the smaller array (t), and rounding down to the next whole number (p). The result, p, is the number of values in each group.

The rows of both arrays are then separated into odd numbered rows and even numbered rows. The values in the odd numbered rows are grouped into groups containing p values, and likewise the values in the even numbered rows of the larger array are groups containing p values.

Next, within each group a number, q, of values are selected to be combined to form a combined odd or even value, depending on whether the group is formed from values in odd numbered rows or even numbered rows, for each group. The number q depends on the angular resolution one is willing to accept when the values arte mapped to the smaller array. If q equals p, in other words, if all the values in each group are combined, resolution will decrease because some of those values will be relatively far from the row to which they are being mapped. On the other hand, if only those values from rows that directly overlap the row to which they are to be mapped are mapped from the larger array to the smaller array, some values that are fairly close the row to which they will be mapped are discarded and valuable information is lost, especially if adjacent values in odd and even rows are ignored, for example four immediately adjacent values from two rows. This leaves a "hole" in the mapping, and this too results in poor resolution in some parts of the smaller array. To reduce the number of "holes", the rows from which the values within each group are selected for combining can be varied. For example, the last value(s) in the last one or more rows in each group of values from odd rows may be disregarded while the same number of values starting at the beginning row of the even rows may be discarded.

Whether this reduction of resolution is acceptable depends in part on the resolution required by down stream processes. In the case of an infra red missile tracking system, the advantages of using an improved sensor are significant. Discarding every fourth row does not harm system performance because the pixels discarded are smaller than the thermal image of the missile being tracked and the tracking algorithms are able to follow the missile even though there are holes in the image. As a result there is an over all gain in system performance.

The number, q, of values in each group are combined to form a combined odd group value or a combined even group value, depending on whether it is formed from values in odd numbered rows or even numbered rows. This combination may simply be by adding the values to each other, or averaging them. The combination may also be a more complex function, weighting the values according to their distance from the row to which the group value is to be mapped or by using some other variable. Other functions could also be used to combine the selected values from each group.

In each column the combined odd values and the combined even values, once determined, are mapped each to one pixel in the smaller array. The steps of the method may be performed in a different order than described immediately above. It will often prove advantageous to form the combined group values for all the odd numbered rows and all the even numbered rows alternately. In this way half the rows of the entire larger array (called a "field") are mapped before the other half of the rows are mapped. This allows whatever process uses the information from the smaller array to begin to process data when only half a frame of data has been mapped. This can save processing time and reduce latency.

Accordingly it is clear that the present invention teaches that the output from a larger array, for example array 20 which is a 640×480 sensor array, can be converted to a smaller array for example array 22 which is 480×120, by using the odd and even sensor scans separately and on the fly, mapping selected pixels from the odd sensor scan to selected tracker array pixels and mapping selected pixels from the even sensor scan to selected tracker array pixels. In the example given, in each column of the sensor array the pixels in the first three rows of the odd sensor scan are mapped to the pixels in the first odd row of tracker array pixels; the pixels in the fourth odd sensor scan row are disregarded. The pixels in the fifth through seventh odd sensor scan rows are mapped to the second odd tracker array row of pixels, and so forth until all the odd numbered rows of sensor pixels have been either mapped or disregarded. After the odd numbered rows of sensor pixels are processed, the even numbered rows of sensor pixels are processed in the same way. In the example given in transforming the data from the even scan, the first even numbered row of sensor pixels is disregarded, and the second, third, and fourth even numbered rows of sensor pixels are mapped to the first even numbered row of the tracker array; the fifth even numbered row of sensor pixels is disregarded and the pixels in the sixth, seventh, and eighth even numbered rows of sensor pixels are mapped to the second even numbered row of tracker array pixels, and so forth until all the even numbered rows have been processed. This method allows processing on the fly and results in minimal errors because, although 25 percent of the pixels are discarded, no two sequential pixels are discarded. With every four scans of rows of sensor array pixels, a single row of tracker array pixels is fully mapped and can be passed to the controller as input to the missile control system. As a result, latency is minimized while the system still is able to take advantage of the finer, more sensitive modern sensor array such as are used in Generation 3 infrared sensors.

What is claimed is:

1. A method of mapping a first array to a second array, each of the arrays having pixels in sequential columns and rows, the first array having
   sequential integers identifying each row of pixels,
   sequential integers identifying each column of pixels,
   a numerical value associated with each pixel,
   the first and second arrays having a one to one pairing between columns of the first and second arrays and groups of four unique pixels in the same column of the first array that are paired one to one with a pixel in the paired column of the second array,
   the method including the steps of
   for each column in the first array,
   selecting the values associated with the pixels in four sequential odd numbered rows to form an odd group of four unique pixels,
   combining the values associated with the pixels in the first three odd numbered rows of the odd group to form an odd combined value, and
   mapping the odd combined value to the pixel in the column and row of the second array with which the odd group is paired,
   selecting the values associated with the pixels in four even numbered rows to form an even group of four unique pixels,
   combining the values associated with pixels in the last three rows of the even group to form an even combined value, and
   mapping the even combined value to the pixel in column and row of the second array with which the even group is paired.

2. The method of claim 1 including repeating the selecting and combining steps of claim 1 for each odd group in the first array and for each even group in the first array,
   mapping the odd combined value of each odd group to the pixel in the column and row of the second array with which the odd group is paired, and
   mapping the even combined value of each even group to the pixel in the column and row of the second array with which the even group is paired.

3. The method of claim 2 in which the steps of selecting, combining, and mapping for one of the odd and even numbered groups is performed and thereafter performing the steps of selecting, combining, and mapping of the other of the odd and even numbered groups.

4. The method of claim 1 wherein the pixels of the first array are populated by values from a sensor.

5. The method of claim 1 wherein the pixels of the first array are populated by values from an infra red sensor.

6. A missile tracking system comprising,
   an infra red sensor having pixels in a first array, said first array being rectangular and populated by values representing the thermal image of a scene;
   a tracker having hardware and software to receive its input in the form of a second array, the second array being rectangular and having fewer pixels than that of the first array; and means for mapping an area of the first array to the second array by corresponding a plurality of adjacent pixels in the area to each pixel in the second array in such a manner that certain pixels in the area are ignored but no two sequential pixels in the area are ignored.

7. A missile tracking system as set forth in claim 6, wherein the adjacent pixels are sequential pixels in one dimension of the first array.

8. A missile tracking system as set forth in claim 7, wherein the first array has m columns and n rows, wherein the second array has s columns and t rows, wherein the rows correspond to the one dimension whereby n is greater than t, and wherein the area mapped from the first array comprises s sequential columns and n sequential rows.

9. A missile tracking system as set forth in claim 8, wherein m is greater than s.

10. A missile tracking system as set forth in claim 8, wherein the second array has 480 columns and 120 rows, whereby the area mapped from the first array comprises 480 sequential columns and n sequential rows.

11. A missile tracking system as set forth in claim 10, wherein the first array has 640 columns and 480 rows, whereby the area mapped from the first array comprises 480 sequential columns and 480 rows.

12. A missile tracking system comprising:
an infra red sensor having pixels in a first array, said first array being rectangular and populated by values representing the thermal image of a scene;
a tracker having hardware and software to receive its input in the form of a second array, the second array being rectangular and having fewer pixels that the first array; and
means for mapping the pixels of the first array to the second array;
wherein the first and second arrays have pixels in sequential columns and rows, the first array having
sequential integers identifying each row of pixels,
sequential integers identifying each column of pixels,
a numerical value associated with each pixel,
the first and second arrays having a one to one pairing between columns of the first and second arrays and groups of four unique pixels in the same column of the first array that are paired one to one with a single pixel in the paired column of the second array,
and wherein the means for mapping the pixels of the first array to the second array includes
for each column in the first array,
means for selecting the values associated with the pixels in four sequential odd numbered rows to form an odd group of four unique pixels,
means for combining the values associated with the pixels in the first three odd numbered rows of the odd group to form an odd combined value, and means for mapping the odd combined value to the pixel in the column and row of the second array with which the odd group is paired, and
means selecting the values associated with the pixels in four even numbered rows to form an even group of four unique pixels.

13. A method of mapping a larger array of values to a smaller array of values, the larger array having m columns and n rows, the smaller array having s columns and t rows where t is an even number, the method comprising the steps of
selecting s columns from the first array and disregarding all values in the columns of the first array other than those in the selected s columns,
determining the largest number, p, of rows in the larger array where p/t is an integer and p<n,
selecting p adjacent rows of the larger array and disregarding the values in rows of the larger array other than those in the selected p rows,
separating the p rows into odd numbered rows and even numbered rows,
separating the t rows of the smaller array into odd numbered rows and even numbered rows,
for each column of the larger array, grouping the values in sequential odd numbered rows into t/2 odd groups, and grouping the values in sequential even numbered rows into t/2 even groups, each group having p/t values in it,
selecting the values in q sequentially numbered rows in each even group and in each odd group, where q<p/t,
combining the selected values in each group to form a combined odd value and a combined even value, respectively, for each odd group and each even group,
for each column mapping in sequence the combined odd value for the group including row 1 of the larger array to row 1 of the smaller array, and for each successive combined odd value to the successive odd numbered row of the smaller array, and
for each column mapping in sequence the combined even value for the group including row 2 of the larger array to row 2 of the smaller array, and for each successive combined even value to the successive even numbered row of the smaller array.

14. The method of claim 13 wherein the number q is selected to achieve a desired resolution in the mapping of the larger array to the smaller array.

15. The method of claim 14 wherein the mapping step includes alternately mapping all the combined odd values and all the combined even values to the smaller array.

16. A method of tracking a missile, said method comprising the steps of:
generating a first array of pixels representative of a thermal image of a scene relevant to the tracking of the missile;
mapping an area of the first array to a second array having fewer pixels than the area of the first array by corresponding a plurality of adjacent pixels in the area of the first array to each pixel in the second array in such a manner that certain pixels in the area are ignored but no two sequential pixels in the area are ignored; and
using the second array to detect the position of the missile.

17. A method as set forth in claim 16, further comprising the step of sending signals based on the second array to the missile to control its direction of travel.

18. A method as set forth in claim 16, wherein the adjacent pixels are sequential pixels in one dimension of the first array.

19. A method as set forth in claim 18, wherein the first array has m columns and n rows, wherein the second array has s columns and t rows, wherein the rows correspond to the one dimension whereby n is greater than t, and wherein the area of the first array comprises s sequential columns and n sequential rows.

20. A method as set forth in claim 19, wherein m is greater than s.

21. A method as set forth in claim 20, wherein the second array has 480 columns and 120 rows, whereby the area of the first array comprises 480 sequential columns and n sequential rows.

22. A method as set forth in claim 21, wherein the first array has 640 columns and 480 rows, whereby the area of the first array comprises 480 sequential columns and 480 rows.

* * * * *